Sept. 8, 1959     J. L. SWARNER     2,902,918
LUMINOUS CEILING DUCT FOR VEHICLES
Filed July 14, 1955     3 Sheets-Sheet 1

INVENTOR
John L. Swarner
BY Wayne Morris Russell
ATTORNEY

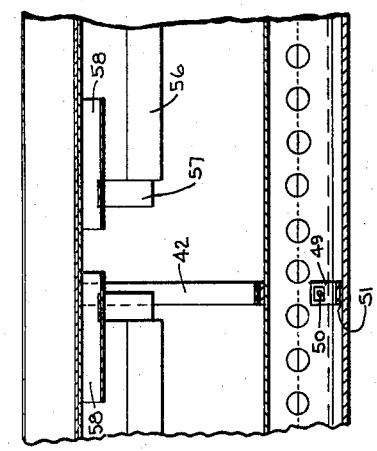
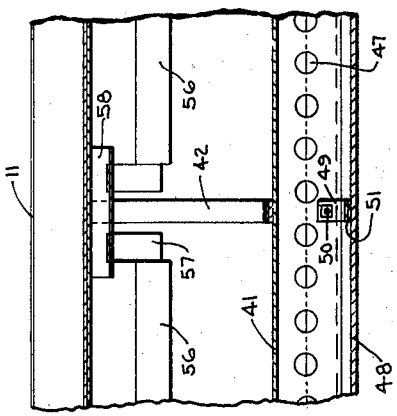
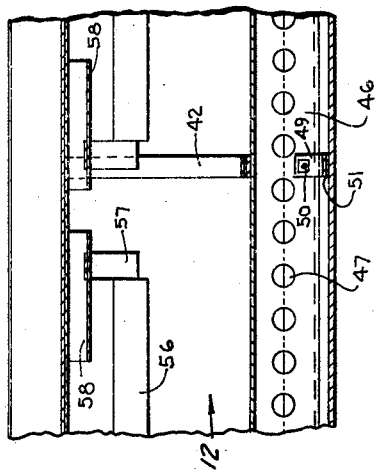
Fig. 2.
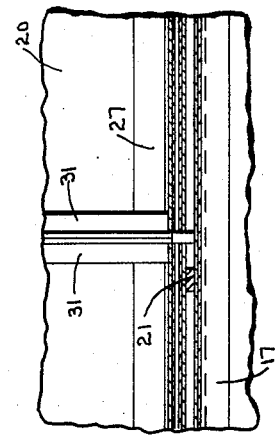
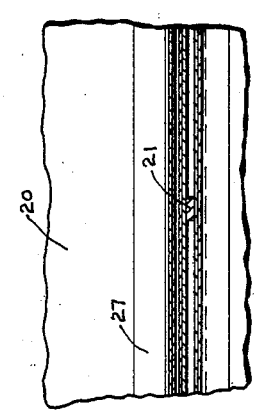
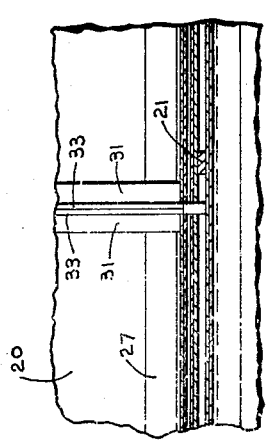
Fig. 4.
INVENTOR
John L. Swarner
BY Wayne Morris Russell
ATTORNEY Sept. 8, 1959  J. L. SWARNER  2,902,918
LUMINOUS CEILING DUCT FOR VEHICLES
Filed July 14, 1955  3 Sheets-Sheet 3

INVENTOR
John L. Swarner
BY Wayne Morris Russell
ATTORNEY

United States Patent Office 2,902,918
Patented Sept. 8, 1959

2,902,918

LUMINOUS CEILING DUCT FOR VEHICLES

John L. Swarner, Valparaiso, Ind., assignor to Pullman Incorporated, a corporation of Delaware Application July 14, 1955, Serial No. 522,019

5 Claims. (Cl. 98—10)

This invention relates to passenger vehicles and is primarily concerned with a combined air duct and air diffusion and lighting arrangement for railway passenger cars.

The principal object of the invention is to provide an air diffusion means on the bottom wall and an air duct for passenger vehicles and wherein the bottom wall forms a portion of the vehicle ceiling to provide an improved means of diffusing air into the passenger space below the ceiling.

Another object of the invention is to provide an air diffusion means on the bottom wall of an air duct for passenger vehicles wherein the bottom wall forms a portion of the vehicle ceiling with the air diffusion means being mounted centrally of the bottom wall so as to direct air down into the passenger space below the ceiling.

Another object of the invention is to provide an air diffusion means on the bottom wall of an air duct for passenger vehicles wherein the bottom wall forms a portion of the vehicle ceiling with the air diffusion means being mounted between the side walls and bottom wall of the duct so as to direct air against the adjacent portions of the ceiling and toward the side walls of the vehicle.

A further object of the invention is to provide a passenger vehicle air duct with a translucent bottom wall forming a portion of the vehicle ceiling with the bottom wall being depressed so as to direct light in the duct against the adjacent portions of the vehicle ceiling.

The foregoing and other objects of the invention will be apparent from the construction and arrangement illustrated in the accompanying drawings wherein Fig. 1 is a cross sectional view through the upper portion of a railway passenger car;

Fig. 2 is a vertical sectional view taken on the line 2—2 of Fig. 1;

Fig. 3 is a sectional view taken on the line 3—3 of Fig. 1;

Fig. 4 is a sectional view taken on the line 4—4 of Fig. 1;

Figure 1:
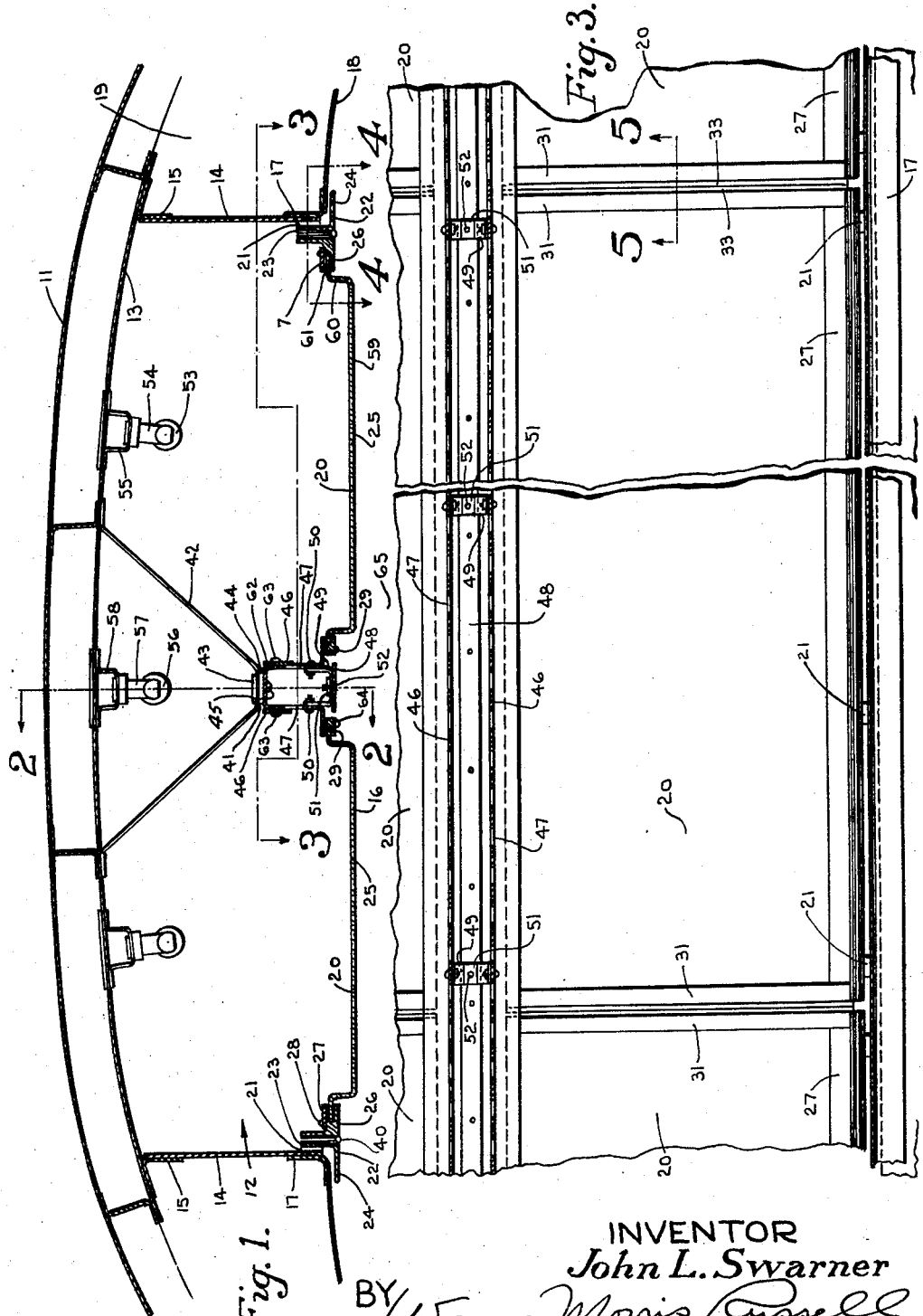
Figure 5:
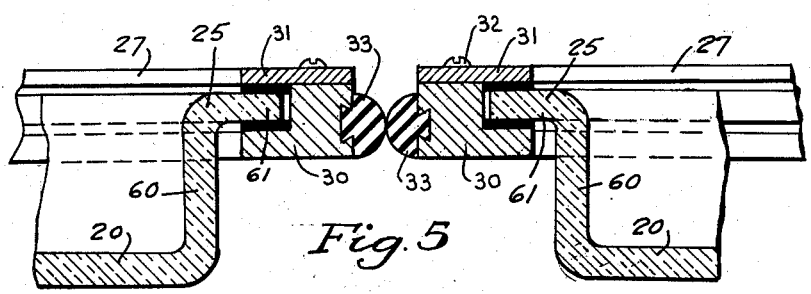
Fig. 5 is a sectional view taken on the line 5—5 of Fig. 3.
Figure 6:
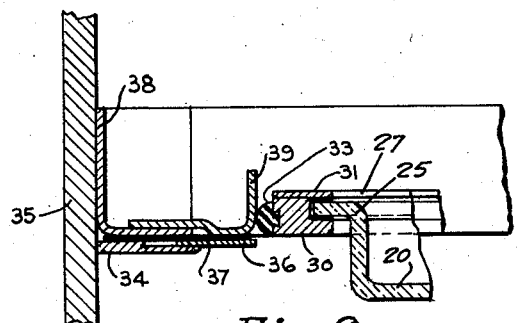
Fig. 6 is a sectional view similar to Fig. 5 of the construction between the endmost panel of the direct bottom wall and the adjacent portion of the car.
Figure 7:
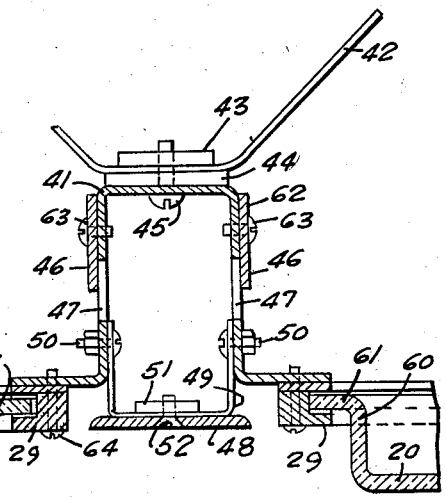
Fig. 7 is a fragmentary sectional view to larger scale illustrating the center support structure in the duct and showing the connection thereto of the duct bottom panels.
Figure 8:
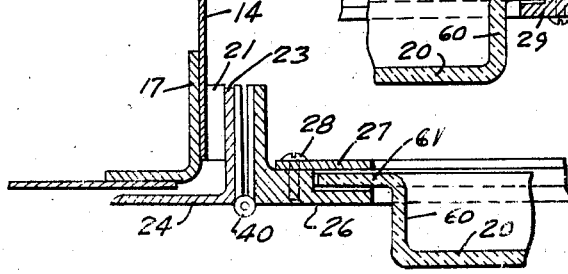
Fig. 8 is a detailed sectional view also to larger scale showing the hinged connection of the duct bottom panel at the side of the duct.

The invention proposes improved air diffusion and lighting means for a passenger vehicle. An air supply and air distribution duct extends longitudinally of the vehicle and is disposed adjacent the roof, and the bottom wall of the duct forms a portion of the ceiling of the vehicle. Means are provided between each side wall and the bottom wall of the duct so that air flows from the duct into the passenger space in a direction parallel with the ceiling and toward the adjacent side wall of the vehicle. Means are also provided centrally of the bottom wall of the duct so that air flows from the duct down into the passenger space of the vehicle. These two air diffusion means at the side walls of the duct and centrally of the bottom wall of the duct provide a distribution of air into the passenger space which prevents drafts on passengers. Lamps are mounted in the duct and the bottom wall of the duct is translucent and depressed so that light is directed through the bottom wall of the duct and against the portions of the ceiling between the duct and the side walls of the vehicle to illuminate these portions of the ceiling. Since lamps are not required outside of the duct, the cost of building the vehicle is reduced as extra lamps and lamp fixtures are not necessary for the portions of the ceiling next to the side walls of the vehicle.

In the drawings, 11 generally designates the roof of a railway passenger car of the coach type and the car has the usual side walls. An air supply and air distributing duct generally designated 12 extends longitudinally of the car for substantially the full length thereof. The duct 12 is comprised of a top wall 13 secured to the roof 11, spaced side walls 14, angles 15 secured to the top wall and side walls, and a bottom wall 16. An angle 17 is secured to each side wall 14 of duct 12 and a ceiling sheet 18 is secured to the horizontal flange of the respective angle and extends to and is secured to the respective side wall of the car. The ceiling sheet 18 and adjacent side wall 14 of the duct and the adjacent portion of the roof 11 together form an exhaust duct 19 at each side of the duct 12. The bottom wall 16 is made up of two rows of sections 20 arranged end to end and extending substantially the full length of the duct 12. Horizontally spaced wood blocks 21 are disposed adjacent one side of each section 20 and are secured to the inner face of the adjacent side wall 14 of the duct and a member 22 in the form of an angle extends the full length of the duct and has its vertical arm 23 secured to the blocks 21 by means of screws (not shown) having countersunk heads and passing through the blocks 21, the wall 14, and threaded into the vertical flange of angle 17 and has a horizontal arm 24 spaced below the ceiling sheet 18. Each section 20 is comprised of a translucent glass panel 25, and a framing member 26 extending substantially the full length of the section supports the adjacent edge of the panel, and a plate 27 having the same length as the framing member is secured to the framing member by screws 28. Another framing member 29 supports the opposite edge of the panel 25 and extends substantially the full length of the section 20. At the end of each section 20 a framing member 30 having a length substantially the same as the width of the section supports the end of the panel 25, and a plate 31 having the same length as the framing member is secured to the framing member by screws 32, and a rubber strip 33 having a length substantially the same as the framing member is mounted in the framing member. These rubber strips 33 assure that air will not flow between the ends of the section 20. At the ends of the duct 12 a plate 34 extending the full width of the duct is secured to an end portion 35 of the car and another plate 36 having the same length as plate 34 is secured to plate 34, and material 37 is secured to the plates and has the same length as the plates. An angle 38 extending the full width of the duct 12 is secured to material 37 and to car end portion 35, and angle 39 having the same length as angle 38 is secured to angle 38 and a portion of the angle rests on material 37. The rubber strip 33 on the endmost section 20 bears against the vertical flange of the angle 39 to prevent the flow of air between the section and the end portion 35 of the car.

Each section 20 has one side connected to the adjacent angle 22 by a hinge 40 extending substantially the full length of the section with the hinge having one leaf secured to arm 23 of the angle and its other leaf to the adjacent framing member 26. A horizontal hat section support 41 is disposed in the duct 12 and extends the full length thereof and is suspended from the top wall 13 of the duct by spaced generally V-shaped straps 42 secured to the top wall, and a plate 43 having a threaded opening is disposed on each strap, and a wood filler 44 is disposed between the strap and the support and a screw 45 extends through each strap and is threaded in the opening in plate 43. The support 41 has spaced side walls 46 and each side wall is provided with a plurality of spaced openings 47. A baffle plate 48 is disposed horizontally and is spaced below the side walls 46 of support 41. The baffle plate 48 extends substantially the full length of the duct 12. Spaced brackets 49 are secured to the side walls 46 of support 41 by bolt and nut assemblies 50, and a plate 51 having a threaded opening is disposed on each bracket, and screws 52 extend through the baffle plate and are threaded in the opening in the plate 51. There are two closely spaced aligned fluorescent lights 53 over each section 20, and light holders 54 are mounted on brackets 55 secured to the top wall 13 of the duct. There are also two aligned closely spaced fluorescent lights 56 between each pair of side-by-side sections 20 directly above the support 41, and light holders 57 are mounted on brackets 58 secured to the top wall 13 of the duct. Each panel 25 has a bottom 59, sides 60 and supporting flanges 61. Plates 62 having spaced vertical slots are slidably mounted for vertical movement on the side walls 46 of support 41 by screws 63 disposed in the slots and threaded into threaded holes in the side walls. There are two aligned plates 62 along the inner side of each section 20 having a combined length substantially the same as the length of the respective section 20. The plates 62 slide over and away from the openings 47 to provide a means of controlling the air flow through the openings. Access to the plates 62 may be had by unscrewing the screws 64 from the threaded opening in the flange of support 41 and letting the respective panel 20 swing down about its hinge 40. The plates 62 may then be adjusted by manipulating screws 63 and the plates with a suitable tool.

Air in the duct 12 flows through the opennigs 47 in the respective side wall of support 41 and then between the section 20 and one side of the baffle plate 48 straight down into the passenger space 65. As stated, the plates 62 may be slid partly over the openings 47 to control the flow of air into the passenger space. Air also flows between the adjacent side wall 14 of the duct 12 and the vertical arm 23 of angle 22 and then between the adjacent portion of the ceiling and the arm 24 toward the adjacent portion of the ceiling and toward the side wall of the car. This air diffusion arrangement between the side walls and the bottom wall of the duct and at the center of the bottom wall prevents drafts on the passengers. The lamps 53 and 56 direct light through the outer side 60 of each panel 25 and against the ceiling sheet 18 to illuminate the portions of the ceiling next to the side walls of the car.

From the foregoing it will be seen that there has been provided an air diffusion means between the side walls and bottom wall of a duct and centrally of the bottom wall which prevents drafts in the passenger space and wherein the bottom wall is translucent and depressed so that lamps in the duct direct light against portions of the ceiling next to the side walls of the car to illuminate them.

What is claimed is:

1. In a passenger vehicle, a roof, a ceiling, an air duct disposed adjacent the roof comprising a top wall and spaced side walls secured to the top wall and a bottom wall forming a portion of the ceiling and air diffusing arrangement, the bottom wall and air diffusing arrangement comprising a horizontal support extending longitudinally centrally of the duct and having a pair of spaced side walls provided with spaced openings therein and connected by an imperforate top wall, means suspending said support in the duct, a panel having hinged means connecting one side thereof to one of the side walls of the duct and having means connecting its other side to one of the side walls on the support, another panel having hinged means connecting one side thereof to the other of the side walls of the duct and having means connecting its other side to the other of the side walls on the support, and a horizontal baffle plate spaced below and secured to the support, air flowing from said duct through the openings in one side wall of the support into the support and between a side of the support and one side of the baffle plate down into the space below the ceiling.

2. In a passenger vehicle, a roof, an air duct disposed adjacent the roof comprising a top wall and spaced side walls secured to the top wall and a bottom wall and air diffusing arrangement comprising a horizontal support extending longitudinally centrally of the duct and having a pair of spaced side walls provided with spaced openings therein and connected by an imperforate top wall, means suspending said support in the duct, a panel having hinged means connecting one side thereof to one of the side walls of the duct and having means connecting its other side to one of the side walls on the support, another panel having hinged means connecting one side thereof to the other of the side walls of the duct and having means connecting its other side to the other of the side walls on the support, and a horizontal baffle plate spaced below and secured to the support, air flowing from said duct through the openings in one side wall of the support into the support and between a side of the support and one side of the baffle plate down into the space below the bottom wall, and means mounted on the side walls of the support for vertical slidable movement over and away from the openings to control the flow of air through the openings into said space.

3. In a passenger vehicle, a roof, side walls, a ceiling, an air duct extending longitudinally of the vehicle and disposed adjacent the roof comprising a top wall and spaced side walls secured to the top wall and a bottom wall and air diffusing arrangement forming a portion of the ceiling, the bottom wall and air diffusing arrangement comprising spaced blocks secured to the side walls of the duct, a member having a vertical arm spaced from the respective side wall of the duct and secured to the respective blocks and having a horizontal arm spaced from another portion of the ceiling and projecting toward the adjacent side wall of the vehicle, a horizontal support disposed in the duct and extending longitudinally thereof and having a pair of spaced side walls provided with spaced openings therein and connected by an imperforate top wall, means suspending said support in the duct, a panel having hinged means connecting one side thereof to one of the members and having means connecting its other side to one of the side walls on the support, another panel having hinged means connecting one side thereof to the other of the members and having means connecting its other side to the other of the side walls on the support, and a horizontal baffle plate spaced below and secured to the support, air in the duct flowing between the side wall of the duct and the vertical arm of the adjacent member and then between the horizontal arm of the member and said second-named portion of the ceiling toward the adjacent side wall of the vehicle and air also flowing through the openings in one side wall of the support into the support and between a side of the support and one side of the baffle plate down into the space below the ceiling.

4. In a passenger vehicle, a roof, side walls, a ceiling, an air duct extending longitudinally of the vehicle and secured to the roof comprising a top wall and spaced side walls secured to the top wall and a bottom wall and air diffusing arrangement forming a portion of the ceiling, the bottom wall and air diffusing arrangement comprising spaced blocks secured to the side walls of the duct, an angle having its vertical arm spaced from the respective side wall and secured to the respective blocks and having its horizontal arm spaced from another portion of the ceiling and projecting toward the adjacent side wall of the car, a horizontal support disposed in the duct and extending longitudinally thereof and having a pair of spaced side walls provided with spaced openings therein and including an imperforate top wall connecting the side walls, means suspending said support in the duct, a panel having hinged means connecting one side thereof to one of the angles and having means connecting its other side to one of the side walls on the support, another panel having hinged means connecting one side thereof to the other of the angles and having means connecting its other side to the other of the side walls on the support, a horizontal baffle plate spaced below and secured to the support, air in the duct flowing between the side wall of the duct and the vertical arm of the adjacent angle and then between the horizontal arm of the angle and said second-named portion of the ceiling toward the adjacent side wall of the vehicle and air also flowing through the openings in one side wall of the support into the support and between a side of the support and one side of the baffle plate down into the space below the ceiling, and means mounted on the side walls of the support for vertical slidable movement over and away from the openings to control the flow of air through the openings into said space.

5. In a passenger vehicle, a roof, a ceiling, an air duct extending longitudinally of the vehicle and disposed adjacent the roof and having spaced side walls and a bottom wall forming a portion of the ceiling, the bottom wall including a support structure having spaced side walls formed with a plurality of openings therein and connected by an imperforate top wall, a horizontal baffle plate spaced below and secured to the support structure and forming with said side and top walls a chamber disposed substantially within the duct between the side walls and extending longitudinally substantially full length of the duct and the chamber being in communication with the interior of the duct and the passenger space, and a section of said bottom wall having one side hingedly connected to one side wall and having its other side connected to said structure and another section of the bottom wall having one side hingedly connected to the other side wall and having its other side connected to the structure.

References Cited in the file of this patent

UNITED STATES PATENTS

| | | |
|---|---|---|
| 2,080,960 | Dreyfuss | May 18, 1937 |
| 2,145,222 | Gunter | Jan. 24, 1939 |
| 2,204,114 | Anderson | June 11, 1940 |
| 2,221,001 | Lucius | Nov. 12, 1940 |
| 2,251,682 | Leadbetter | Aug. 5, 1941 |
| 2,580,835 | Raider | Jan. 1, 1952 |
| 2,585,666 | McDowell | Feb. 12, 1952 |
| 2,651,250 | Marquardt | Sept. 8, 1953 |
| 2,659,807 | Wakefield | Nov. 17, 1953 |
| 2,730,942 | Peterson | Jan. 17, 1956 |
| 2,775,186 | Strobell | Dec. 25, 1956 |